Patented Jan. 14, 1936

2,027,909

UNITED STATES PATENT OFFICE 2,027,909

CARBAZOLE DERIVATIVES

Hermann Hauser, Basel, and Max Bommer, Riehen, near Basel, Switzerland, assignors to the firm Society of Chemical Industry in Basle, Basel, Switzerland No Drawing. Application July 7, 1934, Serial No. 734,209. In Switzerland July 21, 1933

3 Claims. (Cl. 260—46)

It has been found that valuable carbazole derivatives, which may be used both as dyestuffs or as intermediate products for the manufacture of vat-dyestuffs, and which correspond to the general formula

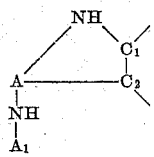

wherein the carbon pair $C_1C_2$ belongs to an aryl radical, A represents an anthraquinone radical, and $A_1$ a polyneuclear radical capable of being vatted, and wherein the NH-group standing between A and $A_1$ may be a member of a carbazole ring in the formation of which the radicals A and $A_1$ are taking part, may be obtained by either causing carbazoles of the general formula

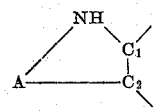

wherein A and $C_1C_2$ have the above indicated significations, and A contains a negative substituent, to react with polynuclear compounds capable of being vatted which contain at least one reactive hydrogen atom linked to nitrogen, or by causing carbazoles of the above general formula, wherein A contains at least one reactive hydrogen atom linked to nitrogen, to react with negatively substituted polynuclear compounds capable of being vatted, and, if desired, treating the reaction products so obtained with condensing or halogenating agents or both.

The reaction is advantageously conducted in the presence of solvents or diluents and in this case it may be of advantage to work with the use of acid binding agents or catalysts or both.

Suitable carbazoles of the above general formula

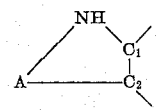

wherein A contains a negative substituent are, for example, nitro- and halogen-, such as, for instance, chlorine- and bromine-derivatives of the phthaloylcarbazoles and phthaloylnaphthocarbazoles which may derive from 1- or 2-halogenated anthraquinones, and which may contain substituents in the anthraquinone radical as well as in the aryl radical, such as, for example, aroylamino-groups or alkyl- or alkoxy-groups.

Carbazoles of the above general formula

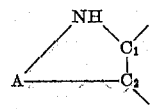

wherein A contains at least one reactive hydrogen atom linked to nitrogen are, for example, aminophthaloylcarbazoles, aminophthaloylnaphthocarbazoles, aminophthaloyldinaphthocarbazoles which may derive from 1- or 2-halogenated anthraquinones and which may contain substituents in the anthraquinone radical as well as in the aryl radical, such as, for example, aroylaminogroups or alkyl- or alkoxy-groups.

Polynuclear compounds capable of being vatted which contain at least one reactive hydrogen atom linked to nitrogen, or negatively substituted polynuclear compounds capable of being vatted are, for example: amines of 1- or 2-anthraquinone, of benzanthrone, of mesobenzdianthrone, of anthanthrone, of dibenzpyrenequinone, of anthraquinone-acridone, pyranthrone or the halogen- such as, for example, chloro- or bromo- or nitro-substitution products of these compounds. These polynuclear compounds capable of being vatted may be substituted by alkyl-, alkoxy-, acylamino-, such as, for example, acetylamino- and benzoylamino-groups.

The reaction products, for the most part obtainable in good yield, may if desired be further treated with condensing agents. For example, from the corresponding imides, by treatment with sulfuric acid, chlorosulfonic acid, aluminium chloride by itself or in union with tertiary aromatic bases, such as, for example, pyridine, or with ammonia, if necessary with addition of an oxidizing agent, for example, manganese dioxide, products are obtained which, besides the pyrrol ring of the carbazole ring system already present, probably contain one or more still further pyrrol rings; or the reaction products before or after such condensation may be treated with halogenating agents, such as, for example, chlorine, bromine or sulfuryl chloride in nitrobenzene or sulfuric acid, or they may first be halogenated and then condensed.

The products obtainable in accordance with the invention may, if desired, be purified, for example by crystallization, by conversion into their salts with strong mineral acids, or by treatment with oxidizing agents, such as hypochlorite-solution. Their leuco-derivatives, for instance the leuco-sulfuric acid esters, may be made in the usual manner.

The following examples illustrate the invention, the parts being by weight:—

Example 1

8 parts of 1,2-phthaloyl-4-bromocarbazole of the formula

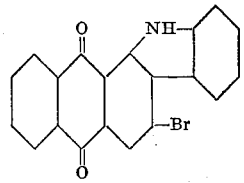

obtainable as described by Ullmann & Illgen, Berichte der deutschen chemischen Gesellschaft, vol. 47, page 382, 6 parts of 1-aminoanthraquinone, 5 parts of anhydrous sodium acetate, 1 part of copper acetate, and 200 parts of naphthalene, are together heated to boiling for 15 hours, while stirring; the mass of the formula

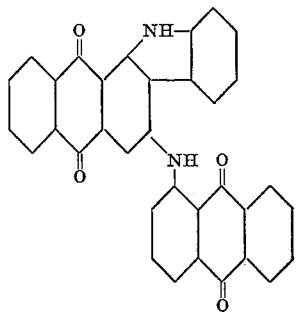

is allowed to cool somewhat, diluted with 200 parts of chlorobenzene and filtered hot. The solid matter is treated with dilute mineral acids to remove the inorganic constituents from it. It is then a red powder which dissolves in concentrated sulfuric acid to a blue solution and dyes cotton in a bordeaux-colored vat bordeaux tints of very good fastness.

Example 2

12 parts of 1,2-phthaloyl-4-bromocarbazole, 12 parts of 1,4-mono-benzoyldiaminoanthraquinone, 10 parts of anhydrous sodium acetate, 1 part of copper acetate and 200 parts of naphthalene are heated together to boiling for 15 hours, while stirring. The mass is allowed to cool somewhat and diluted with 200 parts of chlorobenzene; the product of the formula

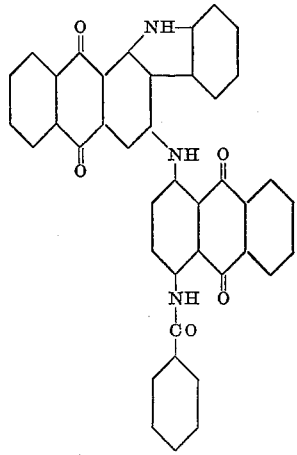

which has separated in the form of small needles, is filtered while hot. It is an olive-green powder, soluble in sulfuric acid of 100 per cent. strength, forming a solution which is at first olive-green but shortly passes into olive-brown. The color of the solution in sulfuric acid containing water is at first grass green; by introducing the sulfuric acid solution into water red flocks are formed. After a short time, more quickly with slight warming, the color of the solution passes to brown and by introducing the solution into water violet-brown flocks are formed.

5 parts of this condensation product are stirred for 2 hours at the ordinary temperature with sulfuric acid of about 98 per cent. strength, whereupon the color of the solution becomes brown. This solution is now poured into ice-water which contains about 1 part of sodium nitrite and the new dyestuff of the formula is subsequently filtered.

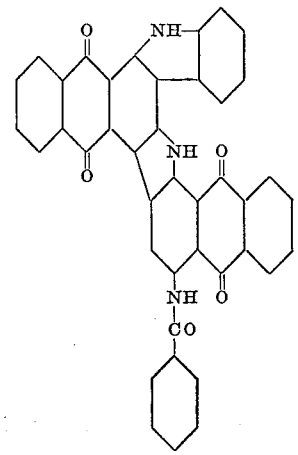

tered. It is a brown powder, soluble in concentrated surfuric acid to a brown solution and dyeing cotton in a red-brown vat very fast and strong red-brown tints.

Example 3

12 parts of 1,2-phthaloyl-4-bromocarbazole. 12 parts of 1,5-mono-benzoyldiaminoanthraquinone, 10 parts of anhydrous sodium acetate, 1 part of copper acetate and 200 parts of naphthalene are heated together to boiling for 10–20 hours while stirring. The product of the formula

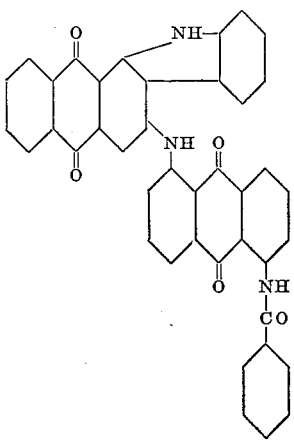

is isolated in the manner described in Example 1. It crystallizes in dark brown needles, soluble in concentrated sulfuric acid to a violet solution and dyeing cotton in a red-brown vat strong bordeaux-red tints, which exhibit good properties of fastness.

5 parts of this condensation product are stirred at 40–50° C. with 100 parts of concentrated sulfuric acid until the color of the solution has become grey-blue. The mass is poured into ice-water and the solid product of the formula

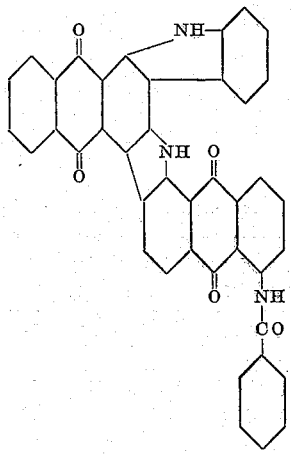

separated by filtration. The product is a brown powder soluble in concentrated sulfuric acid to a blue-grey solution. It dyes cotton in a red-brown vat full brown tints of very good properties of fastness.

*Example 4*

25 parts of brominated 1,2-phthaloyl-6-chlorocarbazole of the formula

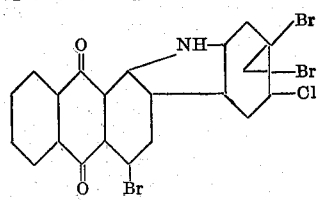

(obtainable for example as described in Example 3 of application Serial No. 734,208, filed July 7, 1934, by condensation of 1-amino-anthraquinone with nitro-para-dichlorobenzene, reduction of the compound obtainable, diazotizing the amine, heating the azimide formed and brominating the 1,2-phthaloyl-6-chlorocarbazole), 6 parts of 1,5-diaminoanthraquinone, 10 parts of anhydrous sodium acetate, 1 part of copper acetate, 1 part of copper powder and 150 parts of nitrobenzene are heated together to boiling for 10–20 hours, while stirring. The product of the formula

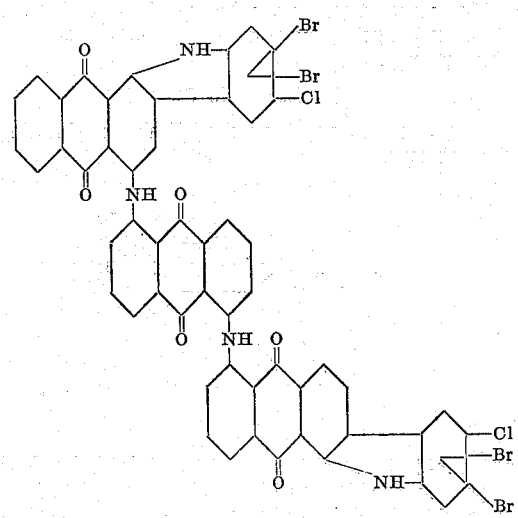

is filtered cold and the solid matter treated with dilute mineral acid to remove inorganic constituents. The residue is a grey powder, soluble in concentrated sulfuric acid to a reddish-blue solution and dyeing cotton in an olive-brown vat strong grey tints.

*Example 5*

30.6 parts of brominated phthaloylcarbazole of the formula

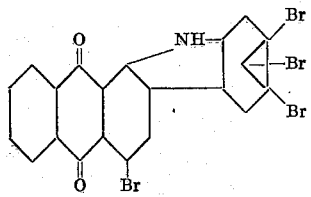

obtainable by brominating 1,2-phthaloylcarbazole in presence of iodine in nitrobenzene at 150–160° C. and containing about 4 atoms of bromine, 17.1 parts of 1,4-mono-benzoyldiaminoanthraquinone, 20 parts of calcined sodium carbonate, 2 parts of copper acetate and 200 parts of naphthalene are heated together to boiling for 18 hours. The mass is allowed to cool somewhat and diluted at about 120° C. with 200 parts of chlorobenzene; the product of the formula

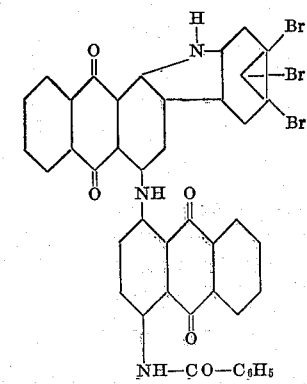

which has separated in the form of small slender grey-green needles is filtered while hot. It is washed successively with chlorobenzene and alcohol and finally the inorganic constituents are removed by boiling with water with addition of some hydrochloric acid.

The new compound is a grey powder which dissolves in sulfuric acid-monohydrate to a green to olive-green solution and dyes cotton in an olive brown vat powerful greenish-grey tints.

*Example 6*

25.0 parts of brominated 1,2-phthaloyl-6-chlorocarbazole of the formula

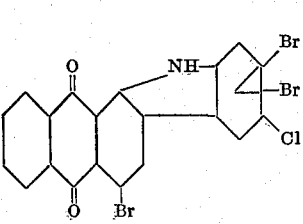

obtainable by brominating 1,2-phthaloyl-6-chlorocarbazole in presence of iodine in nitrobenzene at 150–160° C., and containing about 3 atoms of bromine, 17.1 parts of 1,4-monobenzoyldiamino-anthraquinone, 10 parts of calcined sodium carbonate, 2 parts of copper acetate and 200 parts of naphthalene are heated together to boiling for 18 hours. The mass is allowed to cool somewhat and diluted at about 120° C. with 200 parts of chlorobenzene and then filtered hot; the solid product is washed successively with chlorobenzene and alcohol and then boiled with water with addition of some concentrated hydrochloric acid for the purpose of separating inorganic constituents.

The new compound of the formula

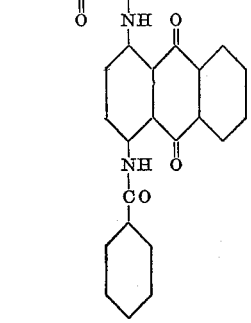

is thus obtained in the form of small slender needles, soluble in sulfuric acid-monohydrate to a dull green solution and dyeing cotton in a vat pure greenish grey tints.

*Example 7*

23.5 parts of amino-dibenzanthrone of the formula

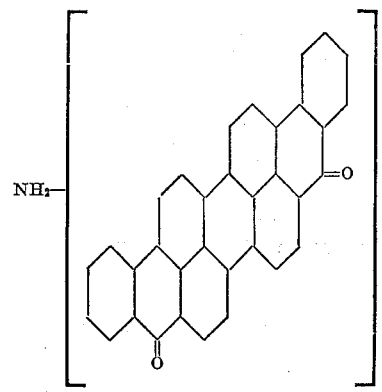

which has been obtained by the action of nitric acid of high percentage on dibenzanthrone in the presence of nitrobenzene, followed by reduction of the mononitrodibenzanthrone thus obtained with sodium sulfide in an aqueous suspension, 35 parts of brominated 1,2-phthaloylcarbazole of the formula

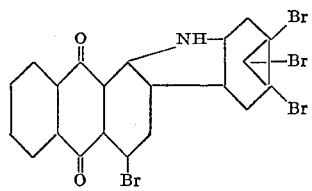

obtainable by brominating 1,2-phthaloylcarbazole in presence of iodine in nitrobenzene at 150–160° C. and containing about 4 atoms of bromine, 20 parts of calcined sodium carbonate, 2 parts of copper acetate and 200 parts of naphthalene are heated together to boiling for 18 hours. The mass is allowed to cool somewhat and diluted at about 120° C. with 200 parts of chlorobenzene; the new compound of the formula

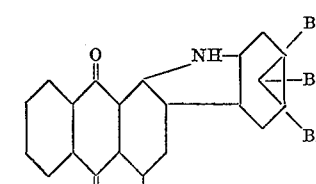
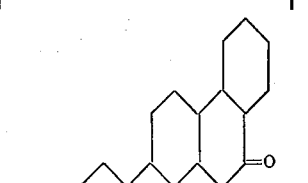
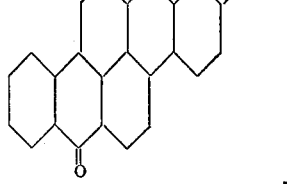

is filtered hot.

When dry it is a grey-blue powder, soluble in sulfuric acid-monohydrate to a blue-violet solution and dyeing cotton in a grey-green vat a strong grey.

*Example 8*

20 parts of brominated phthaloylcarbazole of the formula

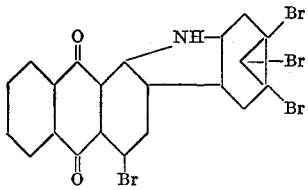

obtainable by brominating 1,2-phthaloylcarbazole in presence of iodine in nitrobenzene at 150–160° C. and containing about 4 atoms of bromine, 11.3 parts of 4-amino-2:1-anthraquinoneacridone of the formula

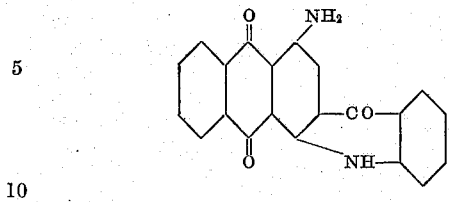

10 parts of calcined sodium carbonate, 2 parts of copper acetate and 200 parts of naphthalene are heated together to boiling for 18 hours. The mass is then allowed to cool somewhat and diluted, while hot, with 200 parts of chlorobenzene; the new compound of the formula

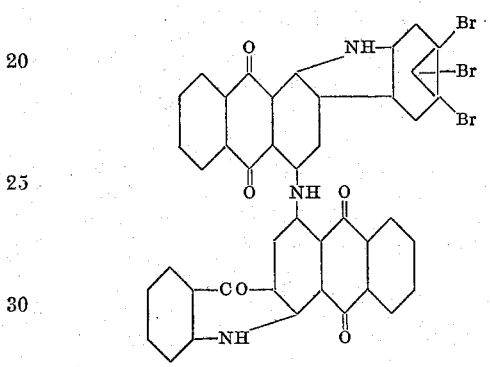

is separated by filtration. It is a dark green powder soluble in sulfuric acid-monohydrate to a blue solution; it dyes cotton in a vat strong dark green tints.

*Example 9*

30.7 parts of brominated phthaloylcarbazole containing about 4 atoms of bromine, 17.2 parts of 1,5-mono-benzoyldiaminoanthraquinone, 20 parts of calcined sodium carbonate, 2 parts of copper acetate and 300 parts of nitrobenzene are heated together to boiling for 18 hours. The product of the formula

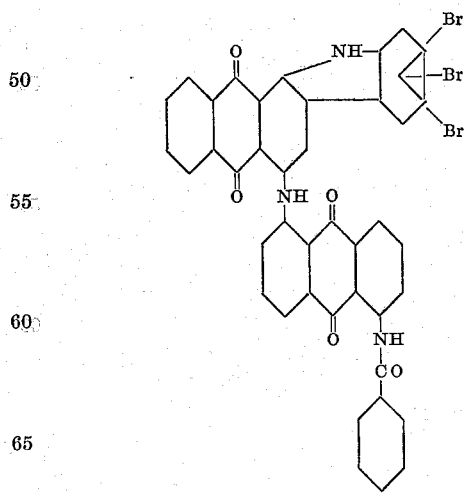

which has separated in the form of small green needles, is filtered cold and freed from inorganic constituents as usual. In concentrated sulfuric acid it dissolves to a blue-green solution. When precipitated from concentrated sulfuric acid at 0° C. it dyes cotton strong and fast grey tints.

When this compound is treated at 40-50° C. with 10 times its weight of sulfuric acid there is obtained a product of the formula

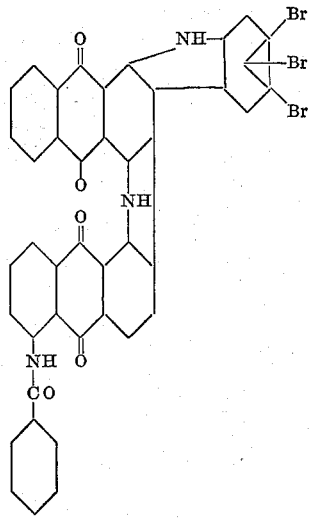

which is a dark powder and dyes cotton blackish-brown tints.

*Example 10*

6 parts of 1,4-diaminoanthraquinone, 35 parts of brominated phthaloylcarbazole, containing about 4 atoms of bromine, 20 parts of calcined sodium carbonate, 2 parts of copper acetate and 200 parts of naphthalene are heated together to boiling for 15 hours. The mass is then cooled somewhat, diluted with 200 parts of chlorobenzene and filtered at about 100° C. The grass-green, solid product of the formula

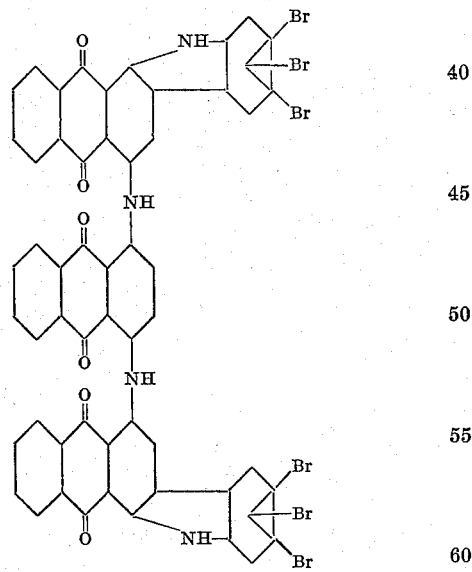

is washed with chlorobenzene and alcohol and finally boiled with water with the addition of some hydrochloric acid. In concentrated sulfuric acid it dissolves to a pure blue solution, from which when poured into water grass-green flocks separate.

30 parts of this compound are introduced into a mass of 120 parts of pyridine and 60 parts of anhydrous aluminium chloride at 100° C. and the whole is heated for 1 hour at about 150° C. This mass is then introduced, while still hot, into warm alkaline hydrosulfite solution, whereupon a red-brown solution is produced. This solution is filtered from a little residue which cannot be vatted and is oxidized at the ordinary temperature by means of air. The new dyestuff of the formula

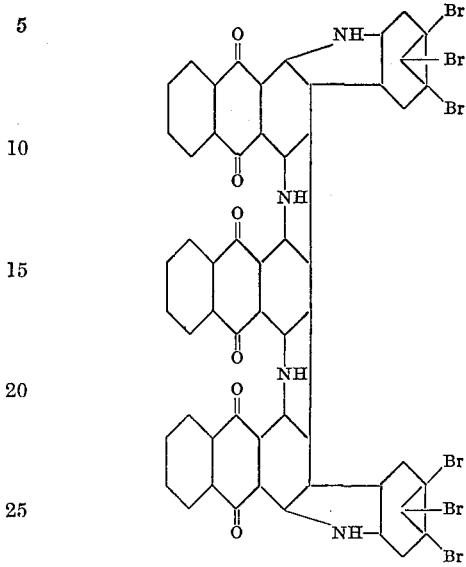

dissolves in concentrated sulfuric acid to a grey-green solution and dyes cotton in a red-brown vat very strong and fast grey tints.

*Example 11*

1 gram of the dyestuff made as described in paragraph 2 of Example 2 is made into a paste with 5 cc. of caustic soda solution of 36° Bé. and 100 cc. of water at 40–50° C.; 2 grams of hydrosulfite conc. powder are added and vatting is continued for ½ hour at the above temperature. Into the dye-bath are introduced 3 cc. of caustic soda solution of 36° Bé. and 1 gram of hydrosulfite and water is added to make up to 2 litres when the stock vat is included, and the stock vat is then introduced. The material is entered at 40–50° C., handled for ¼ hour and then there are added 20 grams of sodium chloride or calcined sodium sulfate. Dyeing is continued for 1 hour at 40–50° C., after which the goods are wrung out, oxidized for ½ hour in the air, rinsed and soured, rinsed again and soaped at boiling. Red brown tints are obtained.

What we claim is:—

1. The carbazole derivatives of the general formula

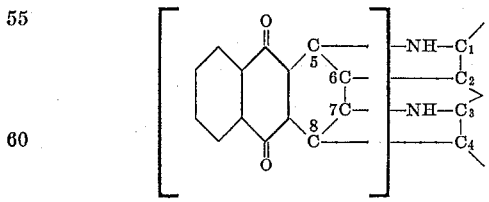

wherein the carbon pair $C_1C_2$ belongs to a phenyl radical, the carbon pair $C_3C_4$ to an anthraquinone radical, and wherein the carbon pair $C_5C_6$ is linked with the carbon pair $C_1C_2$ and the carbon pair $C_7C_8$ is linked with the carbon pair $C_3C_4$, which products constitute brown to red to blue to grey to black powders which dissolve in concentrated sulfuric acid to brown to blue to violet to grey to green solutions and dye cotton from grey to brown to bordeaux vats brown to brdeaux to grey to green tints of very good fastness properties.

2. The carbazole derivatives of the general formula

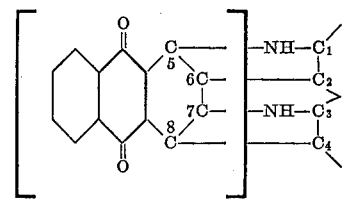

wherein the carbon pair $C_1C_2$ belongs to a phenyl radical, the carbon pair $C_3C_4$ to an anthraquinone radical substituted by a benzoylamino-group, and wherein the carbon pair $C_5C_6$ is linked with the carbon pair $C_1C_2$ and the carbon pair $C_7C_8$ with the carbon pair $C_3C_4$ which products constitute brown to green to black powders which dissolve in concentrated sulfuric acid to brown to violet to grey to green solutions and dye cotton from bordeaux vats brown to grey to green tints of very good fastness properties.

3. The carbazole derivative of the formula

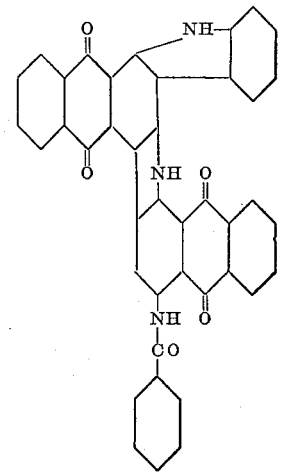

which product constitutes a brown powder which dissolves in concentrated sulfuric acid to a brown solution and dyes cotton from a red-brown vat fast red-brown tints.

HERMANN HAUSER.
MAX BOMMER.